United States Patent [19]

Gay

[11] Patent Number: 4,872,053
[45] Date of Patent: Oct. 3, 1989

[54] DEVICE TO CONTROL THE PRESENCE OF INFORMATION OF IMAGES IN VIDEO SIGNALS

[76] Inventor: Gérard, J. Gay, 5 Parvis du Breuil App.41 92160, Antony, France

[21] Appl. No.: 257,071

[22] Filed: Oct. 13, 1988

[30] Foreign Application Priority Data

Oct. 14, 1987 [FR] France .................... 87 14192

[51] Int. Cl.⁴ .................................. H04N 7/18
[52] U.S. Cl. .......................... 358/108; 358/105; 340/825.65
[58] Field of Search .............. 358/83, 105, 108; 340/825.65

[56] References Cited

U.S. PATENT DOCUMENTS

| | | | |
|---|---|---|---|
| 3,531,588 | 9/1970 | Kartchner | 358/105 |
| 3,641,257 | 2/1972 | Taylor | 358/105 |
| 3,781,468 | 12/1973 | Chomet et al. | 358/105 |
| 3,825,676 | 7/1974 | Ramsden | 358/105 |
| 3,988,533 | 10/1976 | Mick et al. | 358/105 |
| 4,198,653 | 4/1980 | Kamin | 358/108 |

FOREIGN PATENT DOCUMENTS 1582936 1/1981 United Kingdom.

OTHER PUBLICATIONS

The Journal Instruments & Experimental Techniques, vol. 28, No. 3, (May/Jun. 1985) "Television-Line Selector", by Venglyuk; pp. 621–622.
The Journal Proceedings of the 1979 Carnahan Conference on Crime Countermeasures (May 16–18 1979) "A Microcomputer-Based Video Detection System"; by Howington, pp. 127–132.

Primary Examiner—John W. Shepperd
Assistant Examiner—Michael D. Parker
Attorney, Agent, or Firm—Hayes, Soloway, Hennessey & Hage

[57] ABSTRACT

The invention relates to a device for controlling the presence of information concerning images in video signals applicable to a video receiver. The device includes a line detector (3) to detect a predetermined row line with respect to a first line of an image, line cutting circuit (6) to cut this line between two successive instants (t2-t1), and a comparison circuit and counting circuit (8, 15) in order to determine and count transitions characteristic of luminance for a predetermined row line between the successive instants (t2-t1). An alarm (48) is triggered or set off by counting circuit (15) when the number of transitions reaches a threshold not to be exceeded. Application for detecting a test card, for monitoring premises, etc.

7 Claims, 2 Drawing Sheets

DEVICE TO CONTROL THE PRESENCE OF INFORMATION OF IMAGES IN VIDEO SIGNALS

FIELD OF THE INVENTION

The present invention relates to a device for controlling the presence of information of images in video signals applicable to a video receiver with a screen display by means of line scanning, especially lines with two interlaced frames.

This invention may also be applied to detect information relating to the presence of a test card in video signals received by a receiver, for monitoring the access of premises, for triggering message accounting devices of a video receiver, upon receiving an image, for transmitting an alarm when a video signal has a loud level of noise, etc.

BACKGROUND OF THE INVENTION

It is known that there are devices for controlling the presence of information about images in video signals applicable to a video receiver with a display screen. These known devices usually comprise a memory in which reference image information is recorded and corresponds to the images the receiver is able to receive. When the video signals are received by the receiver, the information concerning reference images is compared with the image information present in the video signals received by the receiver so as to trigger an alarm when agreement is not obtained.

In these devices, the information recorded concerns all the scanning lines of the screen for the two interlaced frames, which usually allows an image to be displayed.

These known types of devices are extremely costly and are not very high-performing since, first of all, they require recording of the information of the reference images for all the screen scanning lines and for the two frames required for restoring each image; these devices also require a line by line comparison of all the information concerning images in the received video signals, together with all the reference image information. As a result, these devices require memories having large capacities and involving extremely long processing time, thus rendering these devices as being expensive and unusable in real time.

Moreover, they did not allow for any real time detection of any absence of the video signal, especially when the level of amplitude of the video signals transmitted to a receiver is lower than a receiving threshold.

SUMMARY OF THE INVENTION

The object of the invention is to overcome these drawbacks and in particular to embody a device for quickly controlling the presence of image information in video signals, which operates in real time without it being necessary to record and control all the image information contained in all the lines required to display an image on a screen. The device of the invention also makes it possible to trigger an alarm in the event of interruption of the transmission of the video signals applied to a receiver.

As shall be seen later in detail, these objectives can be obtained, in particular by means of controlling a highly limited amount of image information in video signals, this control being solely effected for a highly limited amount of information relating to a short portion of a single line of an image. The line and line portion are selected in a predetermined way in order to carry out this control.

The object of the invention is to provide a device for controlling the presence of information concerning images in video signals applicable to a video receiver with a display screen by scanning of lines with two interlaced frames. Wherein it comprises means for detecting lines receiving the video signal on one input to mark down an instant characteristic of the start of scanning a predetermined row line with respect to a first line of an image and in order to provide on one output a logical line selective signal characteristic of this predetermined instant, line cutting means connected to the output of the detection means in order to select from the characteristic instant two successive instants separated by a cutting time interval during which a predetermined line portion is scanned, these cutting means providing on one output a logical cutting signal representative of the cutting time interval of the predetermined row line, means for comparing the video signal received on one input and a transition reference voltage received on another input between two levels of amplitudes of image luminance, in other words so as to compare the amplitude variations of the video signal with the reference voltage and in order to provide on one output a signal characteristic of the transitions between two levels of luminance for those parts of the video signal which are able to contain image information, transformation means connected to the output of the comparison means in order to provide on one output a logical signal characteristic of the transitions, and programmable transition counting means connected to the output of the cutting means and to the output of the transformation means so as to count the number of transitions in said predetermined row line portion, one output of this counter being connected to alarm devices triggered when the number of transitions exceeds a predetermined programmed count.

According to another characteristic of the invention, the predetermined row line detection means comprise extraction means receiving said video signal in order to extract from it lines and images synchronization pulses, these pulses respectively being available on the outputs of the extraction means, a programmable count counter/reverse counter connected to the outputs of the extraction means which furnish the line and images synchronization pulses, said counter/reverse counter providing said line selection logical signal on one output when the row of the predetermined row line corresponds to a programmed count, the line cutting means comprising a controlled voltage oscillator connected to the output of the extraction means which furnishes the line synchronization pulses, this oscillator providing on one output cutting pulses of synchronized lines with the line synchronization pulses and having a multiple frequency of the frequency of the line synchronization pulses, and a programmable differential counter connected to the output of the oscillator in order to provide on one output a line cutting logical signal, the differential counter being programmed so that the cutting pulses counted correspond to a period equal to said cutting time interval, and an ET type logical gate connected to the output of the differential counter and to the output of the extraction means in order to furnish on one output the logical cutting signal of the predetermined row line.

According to another characteristic, the programmable transition counting means comprise an ET type counting logical gate connected by one input to the output of the ET gate of the cutting means and connected by another input to the output of the transformation means, this counting gate providing during said cutting time interval of the predetermined row line on one output said characteristic signal of the transitions, and a programmable count alarm counter/reverse counter supplying on one output a logical alarm signal as soon as a programmed transition number is reached.

According to another characteristic, the output of the alarm counter/reverse counter is connected to a memory in order to record the logical alarm signals able to be supplied by the alarm counter/reverse counter for successive images, the alarm only being triggered by an output signal of the memory when a predetermined number of logical alarm signals has been recorded.

According to another characteristic, the extraction means supply on one output clamping pulses, the comparison devices comprising a clamping circuit connected by a first input to the output of the extraction means so as to receive said clamping pulses, a second input of the clamping circuit being connected to a reference potential corresponding in the video signal to the level of voltage of the black color of the image, a third input of the clamping circuit receiving the video signal, this clamping circuit supplying on one output a video signal whose voltage level is referenced with the black color, and a comparator connected by one input to the output of the clamping circuit and connected by another input to a potential corresponding in the video signal to a level of voltage situated between the respective voltage levels of the white and black colors, this comparator supplying on one output said characteristic signal of the transitions.

According to another characteristic, with the extraction means supplying frame synchronization pulses on another output, the device also comprises monostable means connected to this output in order to receive the frame synchronization pulses, these monostable means supplying on one output an alarm triggering signal when no frame pulse is received or when these pulses have insufficient amplitude.

BRIEF DESCRIPTION OF THE DRAWINGS

The characteristics and advantages of the invention shall be more readily understood from reading the following description and referring to the annexed drawings in which.

DETAILED DESCRIPTION OF THE PREFERRED EMBODIMENTS

Figure 1:
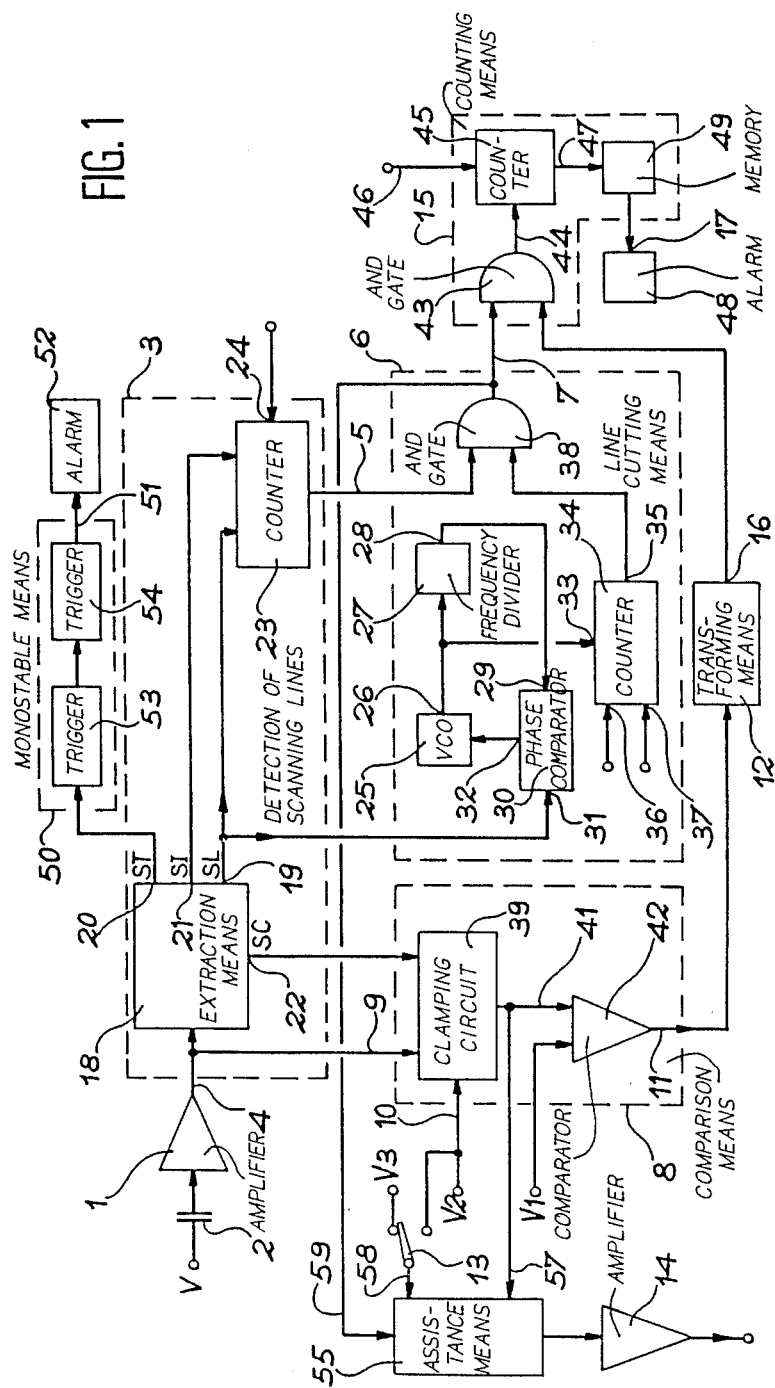
FIG. 1 diagrammatically shows a device for controlling the presence of image information in video signals according to the invention.

FIG. 1 diagrammatically shows a control device according to the invention. This device makes it possible to control the presence of image information in video signals applicable to a display screen video receiver by scanning of lines, for example with two interlaced frames (not shown on the figure). It is supposed that these signals are applied to both the device and the receiver (not shown on the figure) by means of an amplifier 1 whose input receives video signals V through a bypass capacitor 2.

The device comprises means 3 for detecting scanning lines. These detection means receive the video signal on an input 4. They make it possible to mark an instant characteristic of the start of scanning a predetermined row line with respect to a first line of a frame and in particular with respect to the first line of the first frame of each image, as shall be seen later in detail.

The means for detecting lines 3 supply on one output 5 a logical line selection signal characteristic of the predetermined instant of the start and period for scanning a predetermined row line; this row is marked with respect to the first line of the first frame when scanning involves two interlaced frames.

The device also comprises line cutting means 6 connected to the output 5 of the detection means. These cutting means make it possible to select, from the characteristic instant and during scanning a line, two successive instants separated by one cutting time interval during which period a predetermined line portion is scanned.

For a video receiver where scanning comprises 625 lines on two interlaced frames, this is the reason why the detection means 3 make it possible to select for example the row line 155 of the first frame, as shall be seen later in detail ; during scanning of the row line 155, the cutting means enable a selection to be made of the image information contained in the video signal between two instants t1, t2. This information is relative to amplitude variations of the video signal and being characteristic of luminance transitions in the image. The cutting means 6 in fact make it possible to determine a predetermined portion of a predetermined row line. On one output 7, they supply a logical cutting signal representative of the cutting time interval t1–t2 of the predetermined line, as shall be seen later in detail.

The device also comprises comparison means 8 receiving on one input 9 the video signal present on the output 4 of the amplifier 1. A reference voltage V2, which for example, as shall be seen later in detail, is the potential reference level of the black color in an image, is applied to another input 10 of the comparison means 8. The comparison means 8 supply on one output 11 a signal characteristic of the transitions between two colors (for example, between the black and the white in an image) for parts of the video signal able to contain image information. In fact, the comparison means 8 make it possible to restore the potential reference level of the video signal, this level having disappeared on account of the presence of the input capacitor 2.

The device also includes means for transforming 12 transition signals provided by the comparison means 8; these transition signals are thus transformed into signals with two logical states characteristic of color transitions.

The device also comprises operation assistance means 55 receiving on one input 57 the referenced video signal (clamped) derived from the comparison means 8 and receiving on one input 58 a reference voltage V2 (corresponding to the color black) or a reference voltage V3 (corresponding to the color white). Selection of this reference voltage is effected by means of a switch 13. The means 55 also receive on one input 59 the logical cutting signal of the predetermined line representative of the time interval supplied by the cutting means 6. The means 55 supply on one input a signal which is applied to an amplifier. This signal amplified at the output of the amplifier can be applied to a video receiver on whose screen then appears is a white or black colored section (according to the selection made by the switch 13) at the location representing the cutting time interval t1-t2 of the predetermined row line.

The means 55 may be constituted by a circuit functioning as a switch circuit.

Finally, the device comprises programmable transition counting means 15 connected to the output 7 of the cutting means 6 and to the output 16 of the transformation means 12. These programmable counting means make it possible to count the number of characteristic transitions in the selected portion by cutting of the predetermined row line. The counting means 15 are connected by an output 17 to the alarm means 48 which are triggered when the number of transitions in the predetermined rowline portion exceeds a programmed predetermined count.

The cutting means supply on the output 7 a logical cutting signal of a predetermined row line between two predetermined instants t1 and t2. This signal is applied to the programmable counting means 15 which receive in addition between these instants characteristic signals of transitions of colors for the predetermined row line when scanning takes place. The counting means 15 thus count the characteristic transitions of colors of the predetermined row line during the time interval (t2-t1) preselected by the cutting means 6. Accordingly, the alarm 48 can be triggered when the number of transitions counted by the means 15 exceeds a programmed predetermined count. For example, in the case where the device is used as a monitoring device inside a room, the image provided by a camera pointed towards this room must not vary, unless an intruder enters this room. In order to detect this intrusion, should it occur, a predetermined row line portion characteristic of the image is selected which modifies the counted number of transitions for this line portion.

Contrary to the case with known devices, the device of the invention thus acts in real time, since in the state of the technique, it is necessary to carry out a control for all the scanning lines of an image.

The line detection means 3 comprise extraction means 18. These means receive the video signal supplied by the amplifier 1, this signal being deprived of its reference potential level (corresponding for example to the color black in an image). These extraction means respectively supply on the outputs 19, 20, 21, 22 line synchronization pulses SL, a frame pulse ST, an image pulse SI, as well as locking synchronization pulses SC, more often known under the name of "CLAMP" pulses. This extraction circuit is not described here in detail, as it is well-known as regards the state of the technique and is used in all video receivers. In any video signal, the "CLAMP" pulses SC are produced at the same frequency as the line synchronization pulses and, by means of a known circuit in the state of the technique, make it possible to restore the voltage reference level of a video signal, this level corresponding to the black color in an image enabling the video signal to be obtained.

The detection means also comprise a programmable count counter/reverse counter 23 connected to the outputs 19, 21 of the extraction means 18 in order to receive the line synchronization pulses SL and the image pulses SI. The counter/reverse counter 23 supplies on its output 5 the line selection logical signal when the row of the predetermined line corresponds to a programmed count. This count can be applied in the form of an appropriate signal on an input 24 of the counter 23. In this way, it is possible to select, for example, the row line 155. As the counter is loaded with the numerical value 155, reverse counting starts when this counter receives the first line synchronization pulse SL corresponding to the line of row 1. This pulse SL for the row line 1 is immediately supplied after the image synchronization pulse SI. The counter will thus count down 155 line synchronization pulses and supply at the end of reverse or down counting on its output 5 a logical signal indicating that the line selected is currently being scanned. This logical signal, which for example was level 0 during scanning of the row lines 1 to 144 passes to level 1 at the start of scanning of the row line 155 and remains at this level throughout the period of this scanning. The signal then reverts to the logical level 0 at the end of scanning this line.

The line cutting means 6 comprise a controlled voltage oscillator 25 supplied by an output 32 of a comparator 30. This oscillator provides on one output 26 line cutting pulses synchronized with the line synchronization pulses SL and having a multiple frequency of the frequency of these pulses SL. Thus for example, if the frequency of the line synchronization pulses is equal to 15625 Hertz, the oscillator provides on its output 26 pulses whose frequency is equal to $15625 \times 64 = 1$ megahertz. The output 26 of the oscillator 25 is connected to a frequency divider 27 which divides the frequency of the pulses supplied by the oscillator by 64. The output 28 of the frequency divider 27 is connected to an input 29 of a phase detector 30 whose other input 31 is connected to the output 19 of the extraction means 18 in order to receive the line synchronization pulses SL. The phase detector 30 thus receives on each of its inputs pulses having a given frequency equal to 15625 Hertz; it supplies on an output 32 an error voltage which makes it possible to control the frequency of the oscillator 25. As a result, the output 26 of the oscillator 25 provides pulses at a frequency of 1 megahertz perfectly synchronized with the line synchronization pulses. Thus, 64 oscillator pulses are supplied between two line synchronization pulses SL in the example in question.

These pulses supplied by the oscillator are also applied to an input 33 to a programmable differential counter 34. The differential counter 34 supplies on one output 35 a line cutting logical signal. This signal is, for example, level 1 during the selected cutting time interval t2-t1 in the scanning of each line, and logical level 0 outside this time interval. In fact, the counter is programmed by signals applied to its inputs 36, 37 and respectively corresponding to two numerical values. The first of these values represents the number of pulses of the oscillator which this counter must count down from the start of scanning a line and until its output signal passes from the logical state 0 to the logical state 1. This first counting in fact corresponds to the period t1-t0 (t0 being the scanning start instant of a line). The second numerical value represents the number of pulses this counter must count down before its output signal again passes to the logical state 0 at the instant t2. The period t2-t1 for keeping the output signal of the counter 35 at the logical state 1 corresponds in fact to the predetermined time interval for cutting a line during which time it is possible to check the number of transitions characteristic of luminance.

The output 35 of the differential counter 34 is connected to an input of a gate ET 38 whose other input is connected to the output 5 of the line counter/reverse counter 23 of the detection means 3.

The output 7 of the gate ET 38 thus supplies a logical cutting signal of the predetermined row line. In the example in question, this logical signal is supplied during the predetermined time interval (t2-t1) in the course of scanning of the row line 155. This signal has, for example, the level 1 throughout this time interval and the level 0 outside of this time interval during scanning the row line 155.

The comparison means 8 comprise a "clamping" circuit 39 known in the state of the technique, but not described here in detail. This circuit 39 receives the video signals supplied on the output 4 of the amplifier 1 and deprived of their color reference voltage level; it also receives the "CLAMP" pulses SC supplied by the output 22 of the extraction means 18. The input 10 of the clamping circuit 39 corresponds to the input of the comparison means, a color (for example, black) reference potential V2 being applied to said input. This reference potential may be fixed at 0.5 volts; it enables the clamping circuit 39 to restore in a known way its color reference level to the received video signal; as indicated earlier, this video signal is in fact deprived of this reference level on account of the presence of the capacitor 2 at the input of the amplifier 1.

An output 41 of the clamping circuit 39 thus supplies a video signal whose voltage reference level corresponds to, for example, the color black. This output is connected to an input of a comparator 42. Another input of this comparator is brought to the reference potential V1 (for example, 0.7 volts) corresponding in the video signal to the voltage level between, for example, the color black (0.5 V) and the color white (0.5 V = 0.7 V × 1.2 V). The output 11 of the comparator 42 thus supplies a signal in which the luminance transitions (voltage amplitudes) with respect to the reference potential V1 (between the color black and the color white) can be fully detected. The reference potential may be selected between the color black and the color white.

This signal is applied by the transformation means 12 which supply on their output 16 a signal representing the successive logical levels 0 or 1 representative of these luminance transitions of an image.

The programmable transition counting means 15 comprise a logical counting gate 43 of the type ET which is connected by an input to the output 7 of the gate ET 38 of the cutting means. The gate 43 is connected by another input to the output 16 of the transformation means 12. During the cutting time interval t2-t1 of the predetermined row line, this gate thus supplies on one output 44 the characteristic signal of the luminance transitions present in the video signal relating to this line during this time interval.

The output 44 of the counting gate 43 is connected to an input of a programmable count alarm counter/reverse counter. The value of this count can be programmed, for example by a signal applied to an input 46 of the counter/reverse counter 45. Once the programmed number of transitions is reached, a logical signal supplied on an output 47 of the counter 45 passes from a first logical state to a second logical state. This change of logical state may provoke an alarm 48 being set off or triggered.

According to another embodiment of the programmable transition counting means 15, said means include a memory 49 allowing for recording of the logical alarm signals supplied by the counter 45 for several successive images so as to only trigger the alarm 48 when a predetermined number of logical alarm signals has been recorded in the memory 49.

Finally, the device comprises monostable means 50 connected to the output 20 of the extraction means 18 in order to receive frame synchronization pulses ST. These monostable means supply on an output 51 a signal for triggering an alarm 52 when no frame pulse is received during a predetermined time interval.

The monostable means 50 comprise a first monostable trigger circuit 53 whose conduction time is slightly less than the period which separates two successive frame synchronization pulses. In the example in question, this time may be 15 milliseconds, since the frame synchronization pulses are separated by a period of 20 milliseconds for a receiver with 625 lines and two interlaced frames. The monostable means 50 also comprise a second monostable trigger circuit 54 which is connected by an input to an output of the first trigger circuit 53. The second monostable trigger circuit 54 has a conduction period much longer than that of the first trigger circuit (for example, 1 second). At the time of receiving a frame synchronization pulse, the first monostable trigger circuit has on its output a logical signal which passes from the level 0 to the level 1, this logical state reverting to the level 0 before receiving the next frame synchronization pulse. This change of the logical state of the output signal of the first monostable trigger circuit provokes conduction of the second monostable trigger circuit 54 whose output signal passes, for example, from the level 0 to the level 1. This level 1 on the output of the trigger circuit 54 prevents triggering of the alarm 52 for a period much longer than the period which separates two frame synchronization pulses. Beyond this period (for example, 1 second), if there is no longer any frame synchronization pulse and thus there is no video signal or video signal with a level less than a fixed threshold, the output signal of the first monostable trigger circuit 53 no longer changes state and the output signal of the second monostable trigger circuit passes to the logical level 0, thus triggering the alarm 52 which indicates these anomalies.

Figure 2:
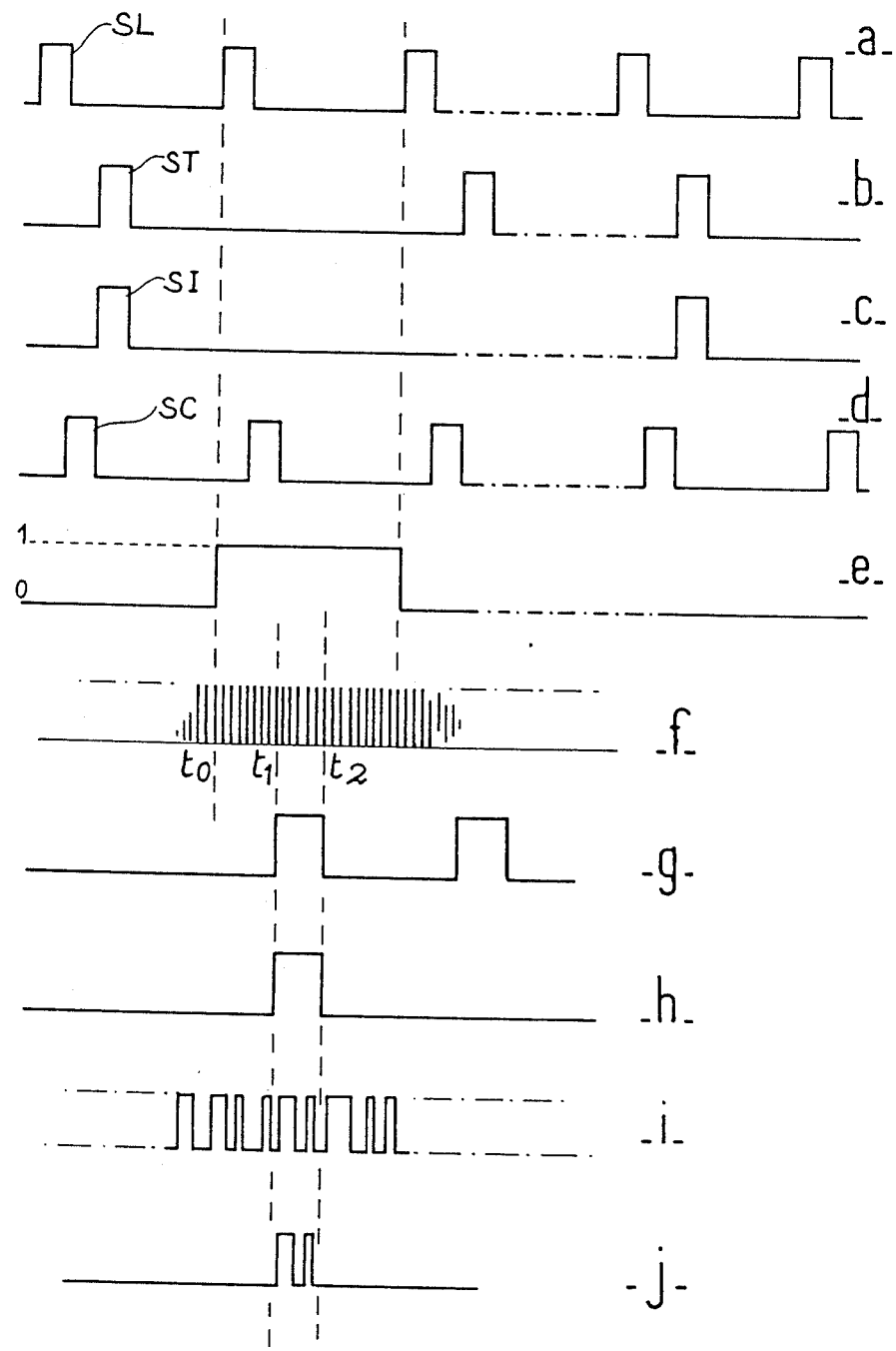
FIG. 2 is a timing diagram of the main signals occurring in the device of the invention.

FIG. 2 is a timing diagram of the main signals occurring in the device of the invention. This timing diagram enables the functioning of this device to be more readily understood The timing diagram represents the line synchronization pulses SL which, for example, have a frequency of 15625 Hertz with 625 lines scanning with two interlaced frames. These SL pulses are available on the output 19 of the extraction means 18.

The timing diagram represents the frame synchronization pulses ST available on the output 20 of the extraction means 18. These frame synchronization pulses have a frequency of 50 Hertz for a 625 lines scanning with two interlaced frames.

The timing diagram c represents the image synchronization pulses S1 available on the output 21 of the extraction means 18. These pulses have a frequency half the frequency of the frame synchronization pulses ST.

The timing diagram d represents the "clamp" pulses SC available on the output 22 of the extraction means 18. These clamp pulses have a frequency equal to that of the line synchronization pulses SL.

The timing diagram e represents the output logical signal of the counter/reverse counter 23, which makes it possible to mark scanning of the predetermined line. In the example shown on this figure, it is supposed that it is desired to mark, for example, the first line of the first frame. The counter/reverse counter 23 is thus programmed to the value 1. Therefore, after receiving a first image pulse S1, the first line synchronization pulse SL provokes passage of the output signal of the counter 23 from the logical level 0 to the logical level 1. This signal remains at the logical level 1 throughout the period of scanning of the row line 1. Of course a signal of the same form would appear between two different line synchronization pulses if a different predetermined row line was selected.

The timing diagram f represents the output pulses of the oscillator 25. These pulses are applied to the differential counter 34. During scanning of each line and according to the programming signals applied to the inputs 36, 37, this counter counts the number of pulses supplied by the oscillator between the start t0 for scanning a line and an instant t1 from which it is desired to count down the number of characteristic transitions of luminance in a scanning line. This counter also counts down the number of pulses supplied by the oscillator between the instants t1 and t2 separated by a time interval corresponding to the period for cutting a scanning line from the instant t1.

For each scanning line, the logical signal supplied by the output 35 of the counter 34 is, for example, a logical level signal 0 between the instant t0 of the start of scanning of each line and the instant t1 of the start of line cutting. This signal passes to the logical level 1 at the instant t1 of the start of cutting of the line and then reverts to the logical level 0 at the end of cutting of the line instant t2. The output signal of the counter 35 is shown on the timing diagram g.

The timing diagram h represents the logical output signal of the gate 38. This gate supplies on its output a signal comparable to that supplied on the output of the differential counter 34, but only during scanning of the selected predetermined row line by means of the output signal of the counter 23. For the other non-selected lines, the logical cutting signal no longer appears at the output of the gate 38.

The output of the gate 43 thus supplies a signal shown at and characteristic of the luminance transitions thresholds which occur in the video signal during the cutting period t2-t1 of the predetermined row line (row 1 for example, or any other preselected row), as represented at j. Thus, it is the number of these transitions counted by the counter/reverse counter 45 which makes it possible to trigger the alarm 48 when a predetermined number of transitions is reached. Of course these transitions may be counted for this predetermined cutting period and for all lines of a given row during scannings of successive images.

The output 47 of the counter 45 supplies a characteristic logical signal when the predetermined count of transitions is attained. In another mode of embodiment, this characteristic logical signal can be recorded in the memory 49 so as to only trigger the alarm 48 when the predetermined count of transitions not to be exceeded has been reached several times during scannings of several successive images.

The invention fully enables the above-mentioned objectives to be attained for example, for monitoring a room regarded to be no longer necessary to control or at the time an intruder appears, the modifications which might occur in all the scanning lines of an image, but only the modifications which occur in the luminance characteristic transitions of a single line and only for a very limited period for scanning of this line. Moreover, the device also makes it possible to trigger an alarm in the event of there being no video signal. This is indeed extremely important in security systems, since it is essential at any time to be absolutely certain that the video signal is received.

The alarm triggering means 50, which are those of the monostable type, may also be means with a triggering voltage threshold allowing the alarm to be triggered should loud background noise occur upon receiving the video signal.

What is claimed is:

1. A device for controlling the presence of image information in video signals applicable to a display screen video receiver by scanning of lines with two interlaced frames, wherein it comprises line detection means receiving the video signal on an input in order to mark an instant characteristic of the start of scanning a predetermined row line with respect to a first line of an image and in order to supply on an output a logical line selection signal characteristic of this predetermined instant, line cutting means connected to the output of the detection means in order to select from the characteristic instant two successive instants separated by a cutting time interval during which a predetermined line portion is scanned, these cutting means supplying on one output a logical cutting signal representative of the cutting time interval of the predetermined row line, comparison means receiving the video signal on one input and receiving on another input a reference voltage of transitions between two image luminance levels in order to Compare the amplitude variations of the video signal with the reference voltage and in order to supply on one output a signal characteristic of the transitions between two luminance levels for parts of the video signal which are likely to contain image information, transformation means connected to the output of the comparison means in order to supply on one output a logical signal characteristic of the transitions, and programmable transition counting means connected to the output of the transformation means in order to count the number of transitions in said predetermined row line portion, an output of this counter being connected to alarm means triggered when the number of transitions exceeds a predetermined programmed count.

2. A device as recited in claim 1, wherein the predetermined row line detection means comprise extraction means receiving said video signal on one input so as to extract line and image synchronization pulses, these pulses being respectively available on outputs of the extraction means, a programmable count counter/-reverse-counter connected to the outputs of the extraction means which supply the line and image synchronization pulses, this counter/reverse-counter supplying on one output said predetermined row line selection logical signal when the predetermined line row corresponds to a programmed count, the line cutting means comprising a controlled voltage oscillator connected to the output of the extraction means which supply the line synchronization pulses, this oscillator supplying on one output line cutting pulses synchronized with the line synchronization pulses and having a multiple frequency of the frequency of the line synchronization pulses, and a programmable differential counter connected to the output of the oscillator in order to supply on one output a logical line cutting signal, the differential counter being programmed so that the counted cutting pulses correspond to a period equal to said cutting time interval, and a logical ET type gate connected to the output of the differential counter and to the output of the extraction means in order to supply on one output the logical cutting signal of the predetermined row line.

3. A device as recited in claim 2, wherein the programmable transition counting means comprise an ET type logical counting gate connected by one input to the output of the ET gate of the cutting means and connected by another input to the output of the transformation means, this counting gate supplying on one output, during said cutting time interval of the predetermined row line, said signal characteristic of the transitions, and a programmable count counter/reverse-counter supplying on one output a logical alarm signal as soon as a programmed number of transitions is reached.

4. A device as recited in claim 3, wherein the output of the alarm counter/reverse-counter is connected to a memory in order to record the logical alarm signals likely to be supplied by the alarm counter/reverse-counter for successive images, the alarm only being triggered by an output signal of the memory when a predetermined number of logical alarm signals has been recorded.

5. A device as recited in claim 3, wherein the extraction means supply on another output clamping pulses, the comparison means comprising a clamping circuit connected by a first input to the output of the extraction means which supply said clamping pulses, a second input of the clamping circuit being connected to a reference potential corresponding in the video signal to the voltage reference level of the black color of the image, a third input of the clamping circuit receiving the video signal, this clamping circuit supplying on one output a video signal whose voltage level is referenced to the color black, and a comparator connected by one input to the output of the clamping circuit and connected by another input to a potential corresponding in the video signal to a voltage level situated between the levels respectively corresponding to the colors black and white, this comparator supplying on one output said signal characteristic of the luminance transitions.

6. A device as recited in claim 5, wherein the extraction means supply on another output frame synchronization pulses, the device also comprising monostable means connected to this output in order to receive the frame synchronization pulses, these monostable means supplying on one output an alarm triggering signal when no frame pulse is received or when the frame pulses have insufficient amplitude.

7. A device as recited in claim 5, wherein it comprises switching means to assist operation, these means being connected to the output of the cutting means in order to receive the logical cutting signal of the predetermined row line, to the output of the clamping circuit in order to receive the video signal with a level of voltage referenced to the color black, and to a two-position switch in order to connect the switching means, either to the potential referring to the color black or to a potential referring to the color white, the switching means supplying on one output a signal applicable to a control screen video receiver in order to have appear on the screen for the predetermined row line a white or black segment, depending on the position of the switch, at the location delimited on this line by the cutting time interval.

* * * * *